United States Patent
Petit et al.

(10) Patent No.: US 10,364,898 B2
(45) Date of Patent: Jul. 30, 2019

(54) METERING VALVE AND DEVICE FOR DISPENSING A FLUID PRODUCT COMPRISING SUCH A VALVE

(71) Applicant: APTAR FRANCE SAS, Le Neubourg (FR)

(72) Inventors: Ludovic Petit, Vitot (FR); Eric Piazzoni, Louviers (FR)

(73) Assignee: APTAR FRANCE SAS, Le Neubourg (FR)

(*) Notice: Subject to any disclaimer, the term of this patent is extended or adjusted under 35 U.S.C. 154(b) by 0 days.

(21) Appl. No.: 14/890,974

(22) PCT Filed: Jun. 2, 2014

(86) PCT No.: PCT/FR2014/051299
§ 371 (c)(1),
(2) Date: Nov. 13, 2015

(87) PCT Pub. No.: WO2014/195616
PCT Pub. Date: Dec. 11, 2014

(65) Prior Publication Data
US 2016/0084385 A1   Mar. 24, 2016

(30) Foreign Application Priority Data
Jun. 4, 2013 (FR) ...................... 13 55117

(51) Int. Cl.
*F16K 3/02* (2006.01)
*B65D 83/54* (2006.01)

(52) U.S. Cl.
CPC ............ *F16K 3/0218* (2013.01); *B65D 83/54* (2013.01)

(58) Field of Classification Search
CPC .................................. F16K 3/02; B65D 83/54
(Continued)

(56) References Cited

U.S. PATENT DOCUMENTS 6,394,321 B1 * 5/2002 Bayer .................... B65D 83/48
                                                     222/402.24
6,626,170 B1 * 9/2003 Barnes ................ A61M 15/009
                                                     128/200.23
(Continued)

FOREIGN PATENT DOCUMENTS

EP    0 774 423 A1    5/1997
FR    2 860 503 A1    4/2005
(Continued)

OTHER PUBLICATIONS

International Preliminary Report on Patentability dated Dec. 10, 2015 from the International Bureau in counterpart application No. PCT/FR2014/051299.
(Continued)

*Primary Examiner* — Jeremy Carroll
(74) *Attorney, Agent, or Firm* — Sughrue Mion, PLLC

(57) ABSTRACT

A fluid dispenser valve including a valve body extending along a longitudinal axis between a first axial end and a second axial end, the valve body containing a metering chamber; and a valve member that slides axially in the valve body between a rest position and a dispensing position, for selectively dispensing the contents of the metering chamber. The metering chamber is connected, in the valve member rest position, to a fluid reservoir, to fill the metering chamber by gravity when the valve is upsidedown with the metering chamber below the reservoir while the valve member is in the rest position, and to empty the metering chamber by gravity when the valve is upright. The valve body includes a first hole and a second hole, to fill and to empty the metering chamber, the first hole being axially offset along the longitudinal axis relative to the at second hole.

20 Claims, 4 Drawing Sheets

(58) Field of Classification Search
USPC .......................................................... 222/402
See application file for complete search history.

(56) References Cited

U.S. PATENT DOCUMENTS

| | | | | |
|---|---|---|---|---|
| 8,580,725 | B2* | 11/2013 | Kuhlman ................ | A61K 8/046 510/276 |
| 2002/0082581 | A1* | 6/2002 | Di Giovanni .......... | B65D 83/54 604/407 |
| 2003/0102328 | A1* | 6/2003 | Abplanalp ............. | B65D 83/48 222/105 |
| 2003/0178448 | A1* | 9/2003 | Warby ................... | B65D 83/54 222/402.24 |
| 2003/0180228 | A1* | 9/2003 | Cripps ................. | B65D 77/003 424/46 |
| 2004/0035417 | A1* | 2/2004 | Ottolangui ............ | B65D 83/54 128/202.17 |
| 2006/0237487 | A1* | 10/2006 | Allsop ................... | B65D 83/54 222/402.2 |
| 2008/0135584 | A1 | 6/2008 | Wickman | |
| 2008/0185402 | A1* | 8/2008 | Fontela .................. | B65D 83/54 222/402.2 |
| 2011/0108582 | A1* | 5/2011 | Ghavami-Nasr .... | B65D 83/425 222/402.2 |
| 2014/0231466 | A1* | 8/2014 | Du Boisbaudry .. | B05B 11/3047 222/402.1 |

FOREIGN PATENT DOCUMENTS

| | | |
|---|---|---|
| WO | 2009/001005 A2 | 12/2008 |
| WO | 2009/071823 A1 | 6/2009 |

OTHER PUBLICATIONS

International Search Report for PCT/FR2014/051299 dated Sep. 19, 2014 [PCT/ISA/210].

* cited by examiner

METERING VALVE AND DEVICE FOR DISPENSING A FLUID PRODUCT COMPRISING SUCH A VALVE

CROSS REFERENCE TO RELATED APPLICATIONS

This application is a National Stage of International Application No. PCT/FR2014/051299, filed on Jun. 2, 2014, which claims priority from French Patent Application No. 1355117, filed on Jun. 4, 2013, the contents of all of which are incorporated herein by reference in their entirety.

The present invention relates to a metering valve and to a fluid dispenser device including such a valve.

"Metering valves" in which an accurate dose of fluid is dispensed each time the valve is actuated are well known in the prior art, and they are generally assembled on a reservoir containing the fluid and a propellant gas that is used to expel the dose. Two types of metering valves are known in particular, namely firstly retention valves that, after filling the metering chamber, close said chamber in leaktight manner until the next actuation of the valve, and secondly valves that fill only before actuation proper, and that are sometimes known as primer valves or ACT valves. For retention valves, a problem may occur of a dose being incomplete and/or non-uniform when it is expelled, in particular after the valve has been stored for a certain time, which results in the active substance no longer being distributed in completely uniform manner in the metering chamber. Furthermore, retention valves may pose priming problems, which may constrain the user to actuate the valve twice so as to be certain of obtaining a complete dose. In order to avoid such problems, ACT valves enable the metering chamber to fill rapidly when the user actuates the valve. With such an ACT-type valve, after each actuation, the metering chamber may fill once again, but if the valve is then stored in its upright position, the metering chamber may then empty into the reservoir, since the metering chamber is not closed in leaktight manner. ACT valves present a drawback in that the quantity of active substance contained in the emitted dose increases between the first and the last emitted dose, with such variations possibly being substantial. This may be a significant drawback depending on the active substance under consideration.

Documents FR 2 860 503, WO 2009/001005, and WO 2009/071823 describe prior-art valves.

An object of the present invention is to improve metering valves of the ACT type, i.e. valves in which the metering chamber is not closed in leaktight manner in the rest position of the valve member.

In particular, an object of the present invention is to provide a metering valve that is simple and inexpensive to manufacture and to assemble and that is reliable in operation.

Another object of the present invention is to provide a metering valve that makes it possible to fill the metering chamber in easy and safe manner before each actuation, while guaranteeing good reliability in operation of said valve.

The present invention thus provides a metering valve for dispensing fluid, the valve comprising: a valve body that extends along a longitudinal axis between a first axial end and a second axial end, said valve body containing a metering chamber; and a valve member that slides axially in said valve body between a rest position and a dispensing position, for selectively dispensing the contents of said metering chamber, said metering chamber being connected, in the rest position of the valve member, to a fluid reservoir containing the fluid to be dispensed, so as to make it possible to fill the metering chamber by gravity when the valve is in an upsidedown position with the metering chamber arranged below the reservoir while the valve member is in the rest position, and so as to make it possible to empty said metering chamber by gravity when the valve is in an upright position with the metering chamber arranged above the reservoir while the valve member is in the rest position; said valve body including at least one first hole and at least one second hole, so as to make it possible to fill and to empty said metering chamber, said at least one first hole being axially offset along said longitudinal axis relative to said at least one second hole.

Advantageously, said at least one first hole is a side hole that is arranged in a cylindrical portion of the valve body.

Advantageously, a plurality of first holes are arranged at the same axial level of said valve body.

In a first advantageous embodiment, said second hole is an axial hole that is arranged in said second axial end of said valve body, on said longitudinal axis.

In a second advantageous embodiment, said at least one second hole is a side hole that is arranged in a cylindrical portion of the valve body, said at least one second hole being axially offset relative to said at least one first hole.

Advantageously, a plurality of second holes are arranged at the same axial level of said valve body.

Advantageously, said at least one first hole has a section that lies in the range 0.05 square millimeters ($mm^2$) to 0.8 $mm^2$, advantageously about 0.2 $mm^2$.

Advantageously, said at least one first hole has a cylindrical section, with a diameter that lies in the range 0.25 millimeters (mm) to 1 mm, advantageously about 0.5 mm.

Advantageously, said at least one second hole has a section that lies in the range 0.05 $mm^2$ to 0.8 $mm^2$, advantageously about 0.2 $mm^2$.

Advantageously, said at least one second hole is substantially cylindrical, with a diameter that lies in the range 0.25 mm to 0.75 mm, advantageously about 0.5 mm.

The present invention also provides a fluid dispenser device including a metering valve as described above.

These characteristics and advantages and others of the present invention appear more clearly from the following detailed description, given by way of non-limiting example, and with reference to the accompanying drawings, in which.

Figure 3:
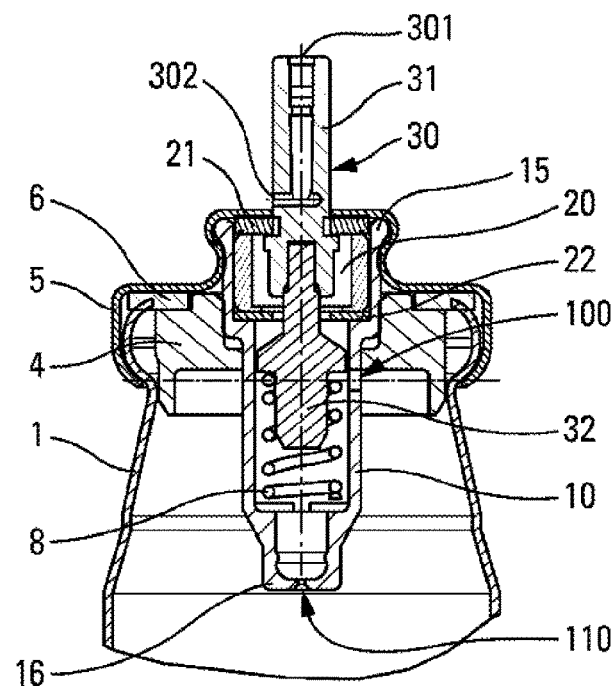
Figure 4:
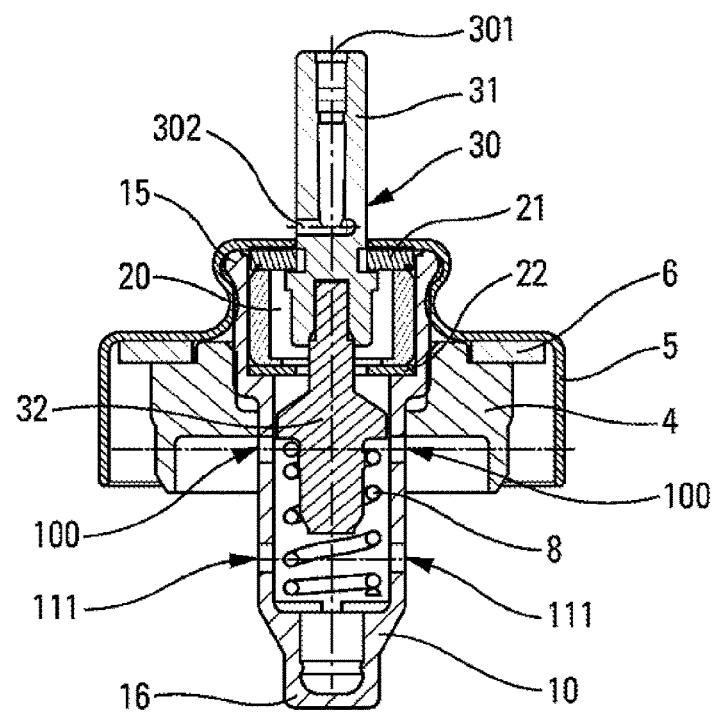

FIGS. 3 and 4 are diagrammatic section views showing two advantageous embodiments of the present invention, in the rest position of the valve member and in the upright position of the valve; and FIGS. 5 to 8 are diagrams respectively showing the impact of the diameter of the axial hole, the impact of the diameter of the side hole, the impact of the number of side holes, and the influence of the side holes on the consistency of the performance of the valve.

Figure 1A:
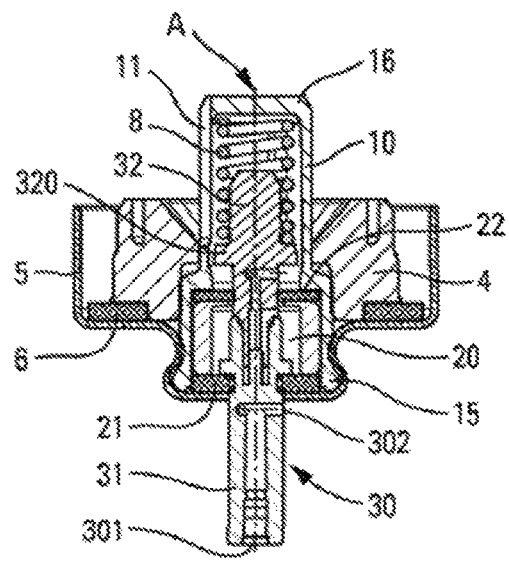
FIGS. 1a and 1b are diagrammatic section views of a prior-art dispenser valve, respectively in the rest position and in the dispensing position of the valve member, with the valve in its upsidedown utilization position.
Figure 1B:
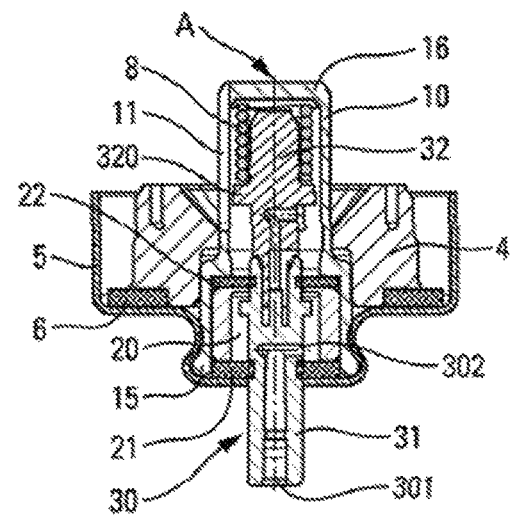
Figure 2:
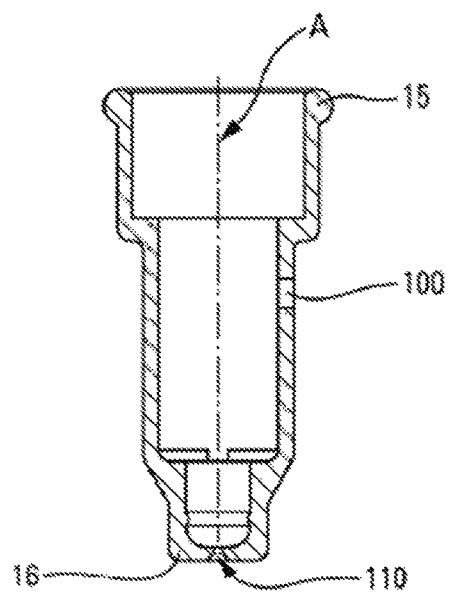
FIG. 2 is a section view of a detail of a valve body in an advantageous embodiment of the present invention.

The metering valve of the ACT type shown in FIGS. 1a and 1b includes a valve body 10 that extends along a longitudinal axis A between a first axial end 15 and a second axial end 16. Inside said valve body 10, a valve member 30 slides between a rest position, that is the position shown in the FIG. 1a, and a dispensing position shown in FIG. 1b, in which the valve member 30 has been pushed into the valve body 10. The valve is for assembling on a reservoir 1, shown in FIG. 3, preferably by means of a fastener element 5 that may be a crimpable, screw-fastenable, or snap-fastenable capsule, and a neck gasket 6 is advantageously interposed between the fastener element and the reservoir. Optionally, a ring 4 may be assembled around the valve body, in particular so as to decrease the dead volume in the upsidedown position, and so as to limit contact between the fluid and the neck gasket. The valve member 30 is urged towards its rest position by a spring 8 that is disposed in the valve body 10 and that co-operates firstly with the valve body 10 and secondly with a portion of the valve member 30 that is a radial collar 320 in this embodiment. A metering chamber 20 is defined inside the valve body 10, said valve member 30 sliding inside said metering chamber so as to enable its contents to be dispensed when the valve is actuated. In conventional manner, the metering chamber is preferably defined between two annular gaskets, namely a valve-member gasket 21, and a chamber gasket 22. FIGS. 1a and 1b show the valve in the upsidedown utilization position, i.e. the position in which the metering chamber 20 is arranged below the reservoir (not shown in FIGS. 1a and 1b). The valve member 30 includes an outlet orifice 301 that is connected to an inlet orifice 302 that is arranged in the metering chamber 20 when the valve member 30 is in its dispensing position. The valve member 30 may be made of two portions, namely a top portion 31 (also known as a valve-member top) and a bottom portion 32 (also known as a valve-member bottom). In this embodiment, the bottom portion 32 is assembled inside the top portion 31.

As shown in FIGS. 1a and 1b, when the valve member 30 is in its rest position, the metering chamber 20 is permanently connected to the reservoir, since the metering chamber 20 is not closed in leaktight manner in the rest position of the valve member 30. The valve body 10 of the prior art generally includes one or more longitudinal openings 11, such as slots, that extend sideways in a cylindrical portion of the valve body, over a fraction of the axial height of the valve body in the direction of the longitudinal central axis A. When the valve is stored in its upright position, the metering chamber 20 thus empties, and when the user wishes to use the valve, the user turns it into its upsidedown position, i.e. the position in which the metering chamber 20 is arranged below the reservoir, so that said metering chamber can be filled by gravity.

Although functioning in generally satisfactory manner, ACT-type metering valves present a drawback with regard to the concentration of active substance, which increases in the emitted doses over successive utilizations of the valve. In other words, the first doses to be dispensed generally contain less active substance than the last doses, this difference in dosage possibly being substantial and thus disadvantageous when the purpose of the dispenser device is to dispense doses of active substance that are constant. The problem is not only the variation in dosage, but also the size of the variation, and it is this variation that it is desirable to minimize.

The inventors have realized in surprising manner that this specific drawback of ACT valves may be substantially reduced by modifying the passage of fluid between the reservoir 1 and the metering chamber 20.

Thus, in the invention, so as to enable said metering chamber 20 to be filled and emptied, the valve body 10 includes at least one first hole 100 and at least one second hole 110 or 111, said first and second holes being axially offset along said longitudinal axis A.

Advantageously, said at least one first hole 100 is a side hole that is arranged in a cylindrical portion of the valve body 10. FIG. 3 shows a first hole 100, but naturally it could have a plurality of first holes 100, e.g. two, three, or four, that are arranged axially at the same level (relative to the longitudinal axis A), and that may be distributed around the periphery of said valve body 10.

Advantageously, the first hole(s) 100 is/are arranged at the level of a wall of the ring 4, thereby making it possible not only to limit the dead volume of the valve in optimum manner, but also to guide the fluid while filling the metering chamber. The FIG. 3 ring presents a wall in contact with said approximately transverse first holes 100, but a ring as shown in FIG. 1, with a sloping wall, may also be envisaged.

FIG. 3 shows an advantageous embodiment of the invention in which said second hole is an axial hole 110 that is arranged in said second axial end 16 of said valve body 10, on said longitudinal axis A. In this configuration, there is only a single such second hole provided at the center of the end wall that forms said second axial end 16 of the valve body 10. However, it is also possible to imagine having a plurality of axial holes arranged in the end wall, in which event the axial holes are distributed around said longitudinal axis A.

FIG. 4 shows another advantageous embodiment of the invention, in which said second hole 111 is also a side hole that, as with the first hole(s) 100, is arranged in a cylindrical portion of the valve body 10, being axially offset relative to said at least one first hole 100. Optionally, a plurality of second holes 111 may be arranged axially at the same level (relative to the longitudinal axis A), and these second side holes 111 may be distributed around the periphery of said valve body 10. In this configuration, the second side holes 111 could be in alignment with the first side holes 100, or, in a variant, they could be offset over the periphery of the valve body. It should be observed that the number of first and second holes could be identical or different.

The various above-mentioned holes may have any appropriate shape, but advantageously, the first and/or second holes are of a shape that is approximately circular in section, with a section that lies in the range 0.05 mm$^2$ to 0.8 mm$^2$, advantageously approximately 0.2 mm$^2$. For a circular hole, this corresponds to a diameter that lies in the range 0.25 mm to 1 mm, advantageously approximately 0.5 mm. It should be observed that the first hole(s) 100 may have shapes and/or dimensions that are different from or identical to the second hole(s) 110 or 111. It is assumed that holes with such dimensions provide a filter function for filtering the active substance so as to limit the variations in dosage. With holes that are too big, this filter effect disappears, and with holes that are too small, the dose can no longer pass quickly between the reservoir and the metering chamber. The number of holes can also have an impact.

Various comparative tests have been performed so as to demonstrate the effectiveness of the invention and so as to evaluate the dimensional characteristics of the holes and their number.

Figure 5:
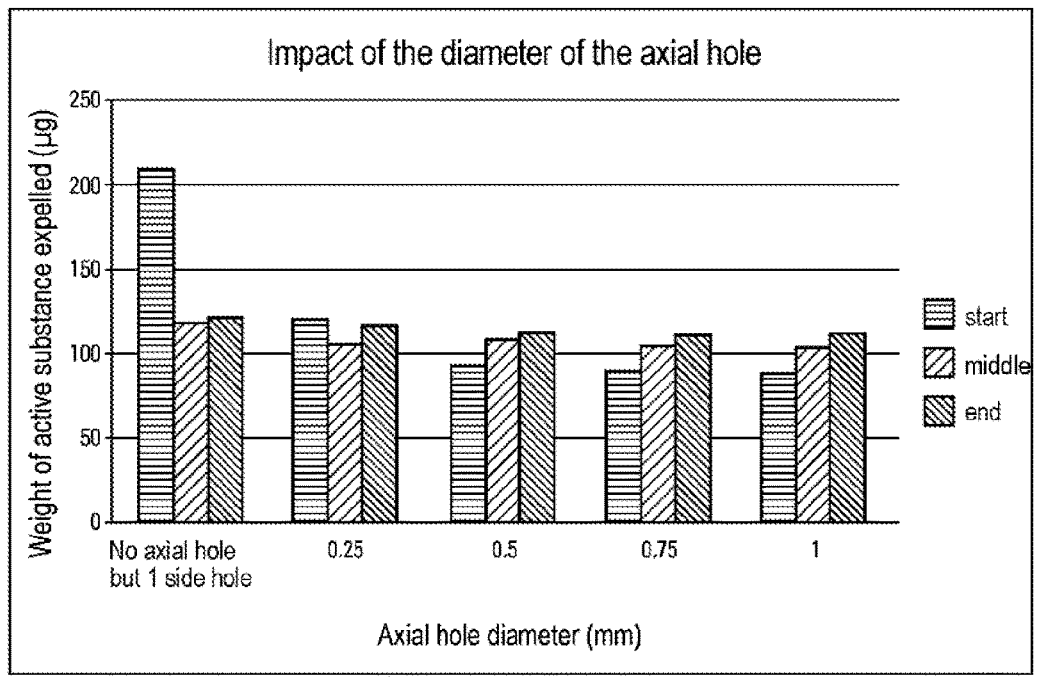

The diagram in FIG. 5 shows the impact of the presence and of the diameter of the axial hole 110. In all of the examples tested, there was a single first side hole 100. It should be observed that in the absence of an axial hole 110, the dosage of active substance varies greatly between the beginning and the end of use of the valve. With an axial hole, the variation decreases, with the dimension of said axial hole having little influence on performance. In this embodiment, the best results are obtained with an axial hole having a diameter that is greater than 0.25 mm and less than 1 mm, preferably less than 0.75 mm. It should be observed that the presence of an axial hole is particularly important for the dosage of the first doses to be dispensed by the valve.

Figure 6:
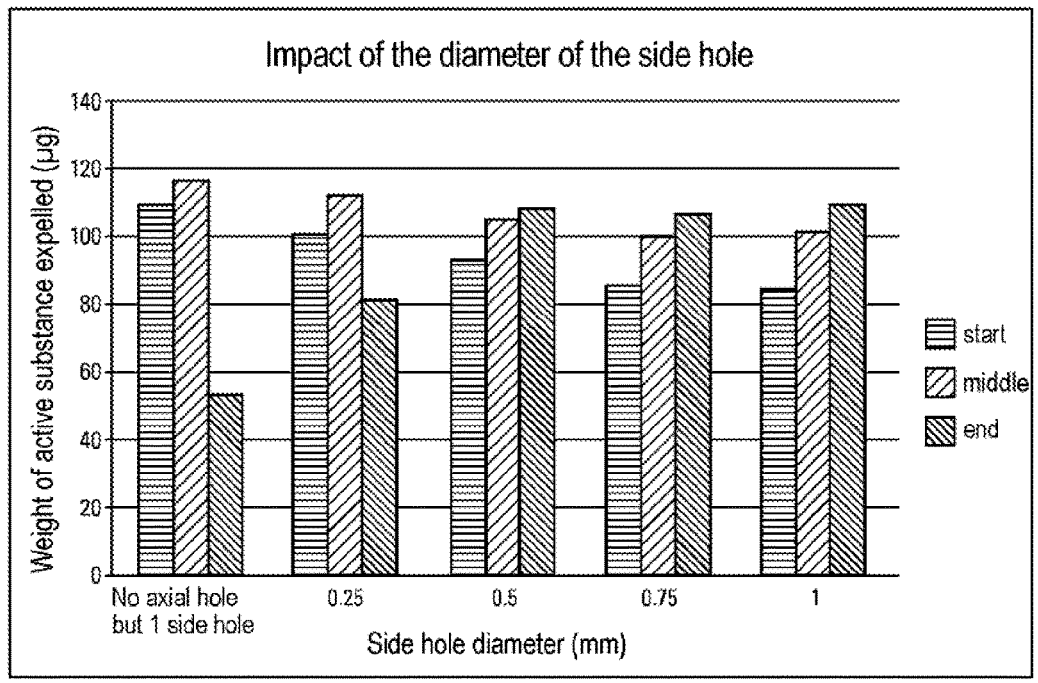

The diagram in FIG. 6 shows the impact of the presence and of the diameter of the side hole 100. It should be observed that in the absence of a side hole 100, the dosage of active substance varies greatly between the beginning and the end of use of the valve. With a side hole, the variation decreases, with the dimension of said side hole having little influence on performance. In this embodiment, the best results are obtained with a side hole having a diameter that is greater than 0.25 mm and less than 1 mm, preferably less than 0.75 mm. It should be observed that the presence of a side hole is particularly important for the dosage of the last doses to be dispensed by the valve.

Thus, FIGS. 5 and 6 demonstrate the importance of combining at least one first side hole that has an impact on the last doses, and at least one other hole that is axially offset and that has an impact on the first doses. It is the combination of these axially-offset holes in the valve body that makes it possible to limit, in optimum manner, the variations in dosage between the first and last doses to be dispensed. This may then be optimized by selecting, in appropriate manner, the dimensions of the respective holes.

Figure 7:
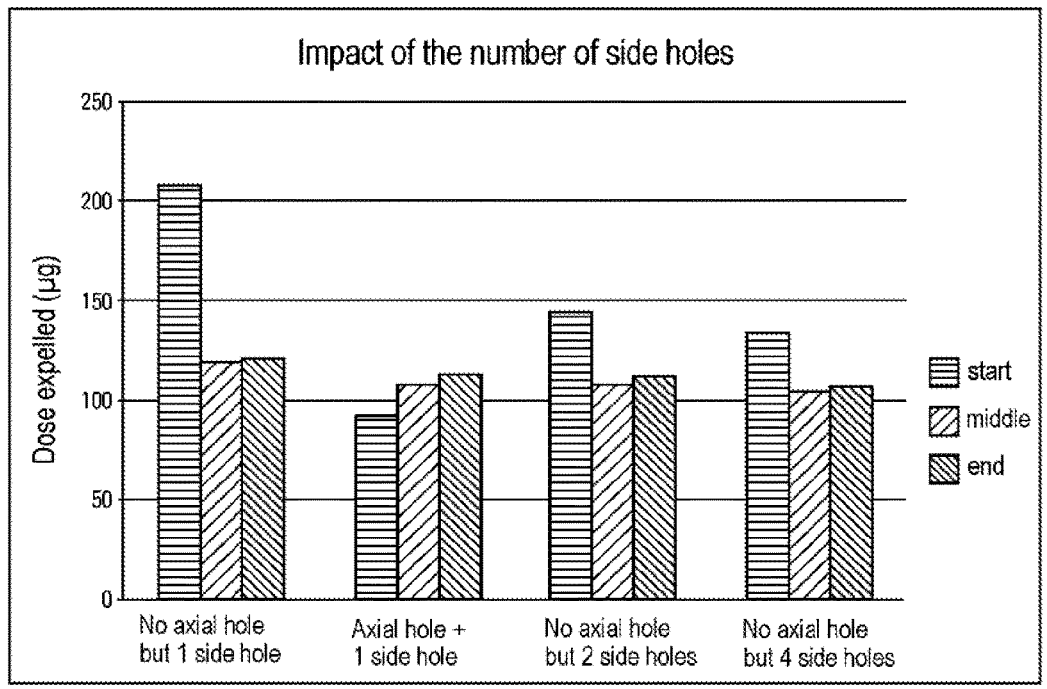

The diagram in FIG. 7 shows the impact of the number of first side holes 100 on the performance of the valve, but also the importance of the presence of an axial hole 110 in the second end 16 of the valve body. Thus, the example on the lefthand side is identical to the example in the FIG. 5 diagram: a single first side hole 100 and no axial hole 110. The second example includes the same first side hole 100 and an axial hole 110 having a diameter of 0.5 mm, which corresponds to the third example in the FIG. 5 diagram. In the third and fourth examples, there are no axial holes 110, but there are two and four first side holes 100 respectively. It should be observed that the presence of the axial hole 110 produces the best results. It should also be observed that the impact of the number of first side holes is real, since the variation in dosage decreases with two side holes, and decreases still further with four side holes. However, it should be observed that the impact of the number of side holes is much less than the impact of the presence of the axial hole.

Figure 8:
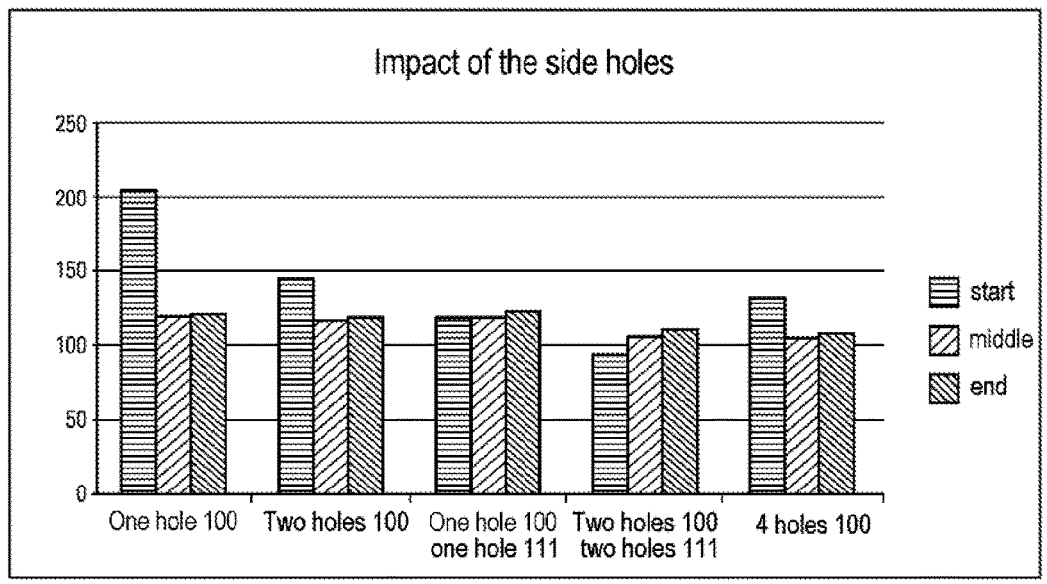

The tests in FIGS. 5 to 7 were performed with a second hole formed in axial manner, but the invention also functions with one or more second side holes 111 as shown in FIG. 4, and as demonstrated by the diagram in FIG. 8.

The diagram in FIG. 8 shows the influence of the side holes 100 and 111. Thus, if there is only a single first side hole 100 and no second side hole 111, the first doses are substantially more concentrated. By increasing the number of first side holes 100, but without adding any second side holes, the difference in concentration decreases progressively, but nevertheless without being eliminated. However, by adding at least one second side hole 111, dosage of satisfactory regularity is obtained. The best results are obtained with a single first side hole 100 in combination with a single second side hole 111.

In addition, the tests were performed with circular holes, but holes of any shape, e.g. oval shaped or polygon shaped, could also be used so long as the sections of the holes remain equivalent.

Although the present invention is described above with reference to several embodiments thereof, naturally it is not limited by the embodiments shown. On the contrary, any useful modification could be applied thereto by a person skilled in the art, without going beyond the ambit of the present invention, as defined by the accompanying claims.

The invention claimed is:

1. A metering valve for dispensing fluid, the valve comprising: a valve body that extends along a longitudinal axis between a first axial end and a second axial end, said valve body containing a metering chamber; and a valve member that slides axially in said valve body between a rest position and a dispensing position, for selectively dispensing the contents of said metering chamber, said metering chamber configured to have a fluid connection, in the rest position of the valve member, to a fluid reservoir containing the fluid to be dispensed and structured so that when the valve is in an upside-down position with the metering chamber arranged below the reservoir while the valve member is in the rest position, the metering chamber is filled by gravity from the reservoir, and so that when the valve is in an upright position with the metering chamber arranged above the reservoir while the valve member is in the rest position, the metering chamber is emptied by gravity into the reservoir; wherein said valve body includes at least one first hole and at least one second hole configured to fill and to empty said metering chamber by gravity, said at least one first hole being axially offset along said longitudinal axis relative to said at least one second hole.

2. The valve according to claim 1, wherein said at least one first hole is a side hole that is arranged in a cylindrical portion of the valve body.

3. The valve according to claim 2, wherein said at least one first hole comprises a plurality of holes that are arranged at a same axial level of said valve body.

4. The valve according to claim 1, wherein said at least one second hole is an axial hole that is arranged in said second axial end of said valve body, on said longitudinal axis.

5. The valve according to claim 1, wherein said at least one second hole is a side hole that is arranged in a cylindrical portion of the valve body, said at least one second hole being axially offset relative to said at least one first hole.

6. The valve according to claim 5, wherein said at least one second hole comprises a plurality of holes that are arranged at a same axial level of said valve body.

7. The valve according to claim 1, wherein said at least one first hole has a section that lies in the range of 0.05 mm$^2$ to 0.8 mm$^2$.

8. The valve according to claim 1, wherein said at least one first hole has a cylindrical section, with a diameter that lies in the range of 0.25 mm to 1 mm.

9. The valve according to claim 1, wherein said at least one second hole has a section that lies in the range of 0.05 mm$^2$ to 0.8 mm$^2$.

10. The valve according to claim 1, wherein said at least one second hole is substantially cylindrical, with a diameter that lies in the range of 0.25 mm to 0.75 mm.

11. A fluid dispenser device, comprising the reservoir containing the fluid and a metering valve according to claim 1, and having the fluid connection, in the rest position of the valve member, to the fluid reservoir containing the fluid to be dispensed so that when the valve is in the upside-down position with the metering chamber arranged below the reservoir while the valve member is in the rest position, the metering chamber is filled by gravity from the reservoir, and so that when the valve is in an upright position with the metering chamber arranged above the reservoir while the valve member is in the rest position, the metering chamber is emptied by gravity into the reservoir.

12. The valve according to claim 11, wherein said at least one first hole has a section that lies in the range of 0.05 mm$^2$ to about 0.2 mm$^2$ and said at least one second hole has a section that lies in the range of 0.05 mm$^2$ to about 0.2 mm$^2$.

13. The valve according to claim 11, wherein said at least one first hole has a cylindrical section with a diameter that lies in the range of 0.25 mm to about 0.5 mm and said at least one second hole is substantially cylindrical with a diameter that lies in the range of 0.25 mm to about 0.5 mm.

14. The valve according to claim 1, wherein said at least one first hole has a section that lies in the range of 0.05 mm$^2$ to about 0.2 mm$^2$.

15. The valve according to claim 1, wherein said at least one first hole has a cylindrical section, with a diameter that lies in the range of 0.25 mm to about 0.5 mm.

16. The valve according to claim 1, wherein said at least one second hole has a section that lies in the range of 0.05 mm$^2$ to about 0.2 mm$^2$.

17. The valve according to claim 1, wherein said at least one second hole is substantially cylindrical, with a diameter that lies in the range of 0.25 mm to about 0.5 mm.

18. The valve according to claim 1, wherein said at least one first hole has a section that lies in the range of 0.05 mm$^2$ to about 0.2 mm$^2$ and said at least one second hole has a section that lies in the range of 0.05 mm$^2$ to about 0.2 mm$^2$.

19. The valve according to claim 1, wherein said at least one first hole has a cylindrical section with a diameter that lies in the range of 0.25 mm to about 0.5 mm and said at least one second hole is substantially cylindrical with a diameter that lies in the range of 0.25 mm to about 0.5 mm.

20. The valve according to claim 1, wherein said at least one first hole has a section that lies in the range of 0.05 mm$^2$ to 0.8 mm$^2$ and said at least one second hole has a section that lies in the range of 0.05 mm$^2$ to 0.8 mm$^2$.

* * * * *